(12) United States Patent
Ogawa (10) Patent No.: US 8,402,801 B2
(45) Date of Patent: Mar. 26, 2013

(54) CORD MANUFACTURING APPARATUS AND CORD MANUFACTURING METHOD

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 173 days.

(21) Appl. No.: 13/063,990

(22) PCT Filed: Sep. 15, 2009

(86) PCT No.: PCT/JP2009/066106
§ 371 (c)(1),
(2), (4) Date: Mar. 15, 2011

(87) PCT Pub. No.: WO2010/032730
PCT Pub. Date: Mar. 25, 2010

(65) Prior Publication Data
US 2011/0167888 A1  Jul. 14, 2011

(30) Foreign Application Priority Data
Sep. 16, 2008 (JP) .................................. 2008-236361

(51) Int. Cl.
*B21D 5/08* (2006.01)
(52) U.S. Cl. .................. 72/176; 72/65; 72/135; 72/137; 72/285; 72/271; 72/261; 72/64; 72/371; 72/127; 72/79; 72/183; 140/88; 140/147; 140/149; 140/545; 152/147; 152/418; 152/426; 152/545; 245/6; 245/1.5
(58) Field of Classification Search .............. 72/65, 135, 72/137, 176, 285, 271, 261, 64, 371; 140/147, 140/149, 88; 152/418, 426, 545, 147; 245/6, 245/1.5
See application file for complete search history.

(56) References Cited

U.S. PATENT DOCUMENTS
2,983,301 A * 5/1961 Leclabart ...................... 72/135

FOREIGN PATENT DOCUMENTS
| EP | 300517 A2 * | 5/1987 | .................. 72/127 |
| FR | 1 546 090 A | 11/1968 | |
| JP | 54-181146 A | 12/1979 | |
| JP | 07-243183 A | 9/1995 | |
| JP | 11-512788 A | 11/1999 | |
| WO | 97/12092 A | 4/1997 | |

OTHER PUBLICATIONS

Chinese Patent Application corresponding to Chinese Patent Application No. 200980135522.X, dated Oct. 29, 2012.

* cited by examiner

*Primary Examiner* — Dana Ross
*Assistant Examiner* — Mohammad Nourbakhsh
(74) *Attorney, Agent, or Firm* — Sughrue Mion, PLLC (57) ABSTRACT

A helical cord having an elliptical shape and the like is manufactured so that a length-to-width ratio or a dimension of a shaped form of the cord to be shaped in a longitudinal direction can be changed. A cord (C) is sequentially passed through through holes (21H, 22H) of stationary and movable shaping bodies (21, 22) opposing each other of a shaping device (20). At that time, the movable shaping body (22) is moved along the stationary shaping body (21) by a moving device so that the through holes (21H, 22H) become eccentric with respect to each other, and the cord (C) passing between the eccentric through holes (21H, 22H) is bent and deformed so as to be shaped. Also, a first and a second displacement mechanism that displace the movable shaping body (22) in X- and Y-directions are provided in the moving device, the movable shaping body (22) is thereby reciprocatingly displaced in the both directions in synchronization by displacement amounts which were set, respectively, the movable shaping body (22) is continuously moved in response to the displacements in the both directions, and thus the passing cord (C) is shaped.

6 Claims, 6 Drawing Sheets

FIG. 8

CORD MANUFACTURING APPARATUS AND CORD MANUFACTURING METHOD

This is a National Stage of International Application No. PCT/JP2009/066106 filed Sep. 15, 2009, claiming priority based on Japanese Patent Application No. 2008-236361 filed Sep. 16, 2008, the contents of all of which are incorporated herein by reference in their entirety.

TECHNICAL FIELD

The present invention relates to a cord manufacturing apparatus and a cord manufacturing method for manufacturing a cord shaped in a longitudinal direction.

BACKGROUND ART

In a pneumatic tire, it is known that a helical cord (curled cord) shaped in the helical state (circular spring state) and curled so as to form a circular shape when seen from the longitudinal direction, for example, is used as a stretchable and elastic internal reinforcing member. Also, in the past, as a manufacturing apparatus of such a cord, an apparatus that manufactures a helical cord without ply by applying circular shaping while collecting and driving a large number of steel wires has been known (See Patent Document 1).

However, in the case of a circular helical cord having the constant length-to-width ratio of the shaping form, since characteristics including stretching properties, rigidity and the like depend on a shaping diameter (outer diameter dimension of the circular shape) of the cord and stretching properties, an arrangement dimension and the like are determined by a relationship with a shaping diameter, there is a problem that they cannot be selected freely but are restricted in practical use. Specifically, when this helical cord is applied to a tire constituent member such that a plurality of the cords is coated with unvulcanized rubber so as to form a sheet-shaped reinforcing body, if the shaping diameter needs to be increased in order to obtain required stretching properties, the thickness of the reinforcing body itself is also increased accordingly. Thus, an application range might be narrowed such that the reinforcing body cannot be used due to the relationship with an installation space in a tire or can be used only for a limited application. As described above, the circular helical cord has a low degree of freedom in application and its application tends to be limited.

On the other hand, as a similar reinforcing member for a tire, a high elongation (H.E.) cord and a wavy cord shaped in the wavy form in the longitudinal direction have been used. However, with the high elongation cord, there is a possibility that a sufficient elongation rate cannot be obtained and large deformation applied during manufacture or use of the tire cannot be handled, which limits an application range. On the other hand, since the deformation directions of the wavy cord lie in the same plane, the shape and rigidity of the cord are different in directions and the characteristics of the cord come to have directivity, which limits a portion where the cord is to be used or an attitude of the cord.

PRIOR ART REFERENCES

Patent Document

Patent Document 1: Japanese Utility Model Registration Application No. 54-181146

DISCLOSURE OF THE INVENTION

Problems to be Solved by the Invention

The present invention was made in view of the above prior-art problems and has an object to enable adjustment and change of the shaped form and characteristics of a cord and to improve a degree of freedom in selection or application of the cord by enabling change of a length-to-width ratio and a dimension of the shaping form of a cord shaped in the longitudinal direction so as to manufacture a helical cord having an elliptical shape and the like.

Means for Solving the Problems

The present invention is a cord manufacturing apparatus that manufactures a cord shaped in the longitudinal direction, provided with a stationary shaping body and a movable shaping body arranged opposite to each other and having through holes through which the cord is passed, respectively, the movable shaping body being capable of moving along the stationary shaping body so that the through holes become eccentric with respect to each other; a supply device that supplies and sequentially passes the cord through the through holes of respective shaping body; and a moving device that bends and shapes the cord passing between the through holes having become eccentric with respect to each other due to movement of the movable shaping body, wherein the moving device has a first and a second displacement mechanism which reciprocatingly displace the movable shaping body in directions crossing each other and whose displacement amounts can be independently changed and a driving mechanism that moves the movable shaping body in response to the displacement in the both directions by driving the first and second displacement mechanisms.

Also, the present invention is a manufacturing method of a cord for manufacturing a cord shaped in the longitudinal direction, provided with the steps of: sequentially passing a cord through through holes of a stationary and movable shaping bodies arranged opposite to each other; and moving the movable shaping body along the stationary shaping body so that the through holes become eccentric with respect to each other, bending and shaping the cord passing between the eccentric through holes, wherein the shaping step includes the steps of reciprocatingly displacing the movable shaping body in directions crossing each other by respective set displacement amounts, and shaping the passing cord while moving the movable shaping body in response to the displacements in the both directions, and the respective set displacement amounts can be changed independently of each other.

Advantages of the Invention

According to the present invention, the length-to-width ratio and dimension of the shaping form of the cord shaped in the longitudinal direction can be changed, and the shaping form and characteristics of the cord become adjustable and changeable by manufacturing a helical cord having an elliptical shape or the like so that a degree of freedom in selection and application of the cord can be improved.

DESCRIPTION OF EMBODIMENTS

An embodiment of the present invention will be described below by referring to the attached drawings.

In a cord manufacturing apparatus and a cord manufacturing method of this embodiment, a cord is continuously shaped so as to manufacture a cord shaped in a helical form, a wavy form and the like in the longitudinal direction. Here, a case in which a reinforcing body used as a tire constituent member is formed by shaping a cord and also by coating the cord with unvulcanized rubber will be described as an example.

Figure 1:
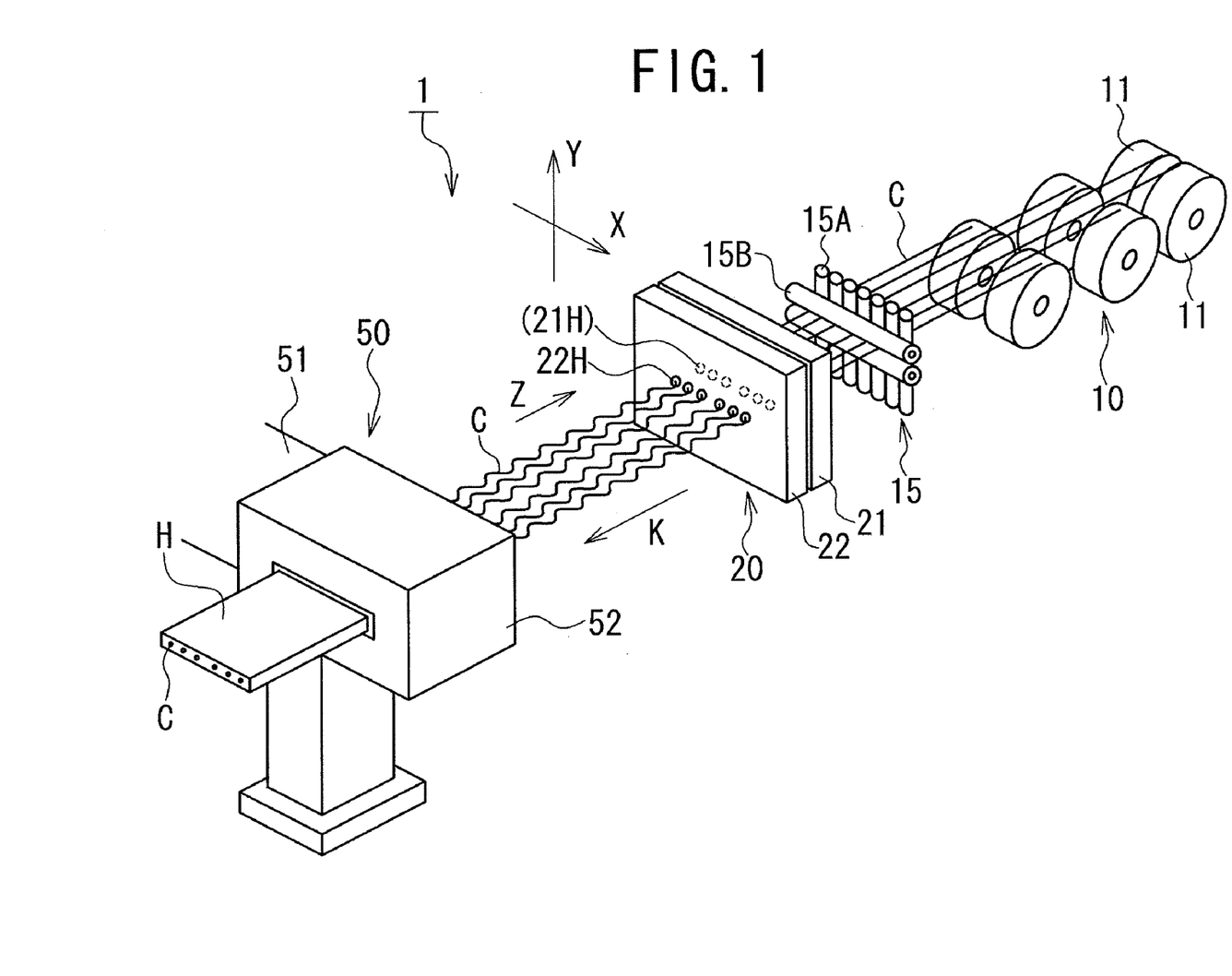
FIG. 1 is a perspective view illustrating an outline configuration of a cord manufacturing apparatus of this embodiment.

FIG. 1 is a perspective view illustrating an outline configuration of a cord manufacturing apparatus of this embodiment, in which the respective essential parts thereof are shown schematically.

A cord manufacturing apparatus 1 is provided with, as shown in the figure, a cord feeding-out device 10, an aligning device 15, a shaping device 20, and a rubber coating device 50 that coats a cord C with unvulcanized rubber, which are disposed sequentially along a moving path (See an arrow K) of the cord C, and they are arranged separately from each other in a linear state. Also, the cord manufacturing apparatus 1 is provided with a conveying device (not shown) for a reinforcing body H composed of a plurality of the cords C coated with the unvulcanized rubber, and whereby the reinforcing body H is conveyed or the like and each cord C is moved along the moving path.

The cord feeding-out device 10 is provided with a plurality of (six in the figure) bobbins 11, each winding up the linear cord C, and a stand (not shown) that supports each bobbin 11 rotatably, and reels out the cord C from each bobbin 11 at a predetermined speed while maintaining a tension and feeds the cord C toward the aligning device 15.

The aligning device 15 has a plurality of rolls 15A arranged on the upstream side in the moving direction (hereinafter this side is referred to as the upstream side and the opposite side as the downstream side) of the cord C sandwiching each cord C between each of them and a pair of upper and lower rolls 15B arranged adjacent to the rolls 15A on the downstream side and sandwiching the plurality of the entire cords C between them. The rolls 15A and 15B are installed crossing each other. The aligning device 15 aligns each of the cords C by inserting them through each of juxtaposed gaps formed between the rolls 15A and 15B and supplies the plurality of cords C by rotating the rolls 15A and 15B toward the shaping device 20 on the downstream side in a condition parallel with each other. Therefore, the supply device of the cord C is composed of the cord feeding-out device 10 and the aligning device 15 and the like, here. Also, in this cord manufacturing apparatus 1, the plurality of cords C is aligned in the horizontal direction (X-direction in the figure) and are also moved along the same horizontal plane orthogonal to the perpendicular direction (Y-direction in the figure).

The shaping device 20 has a stationary shaping body 21 and a movable shaping body 22 which function as dies (bases) for shaping the cord C, and they are arranged adjacently and opposite to each other on the upstream side and the downstream side of the cord C. Each of the both shaping bodies 21 and 22 has a substantially rectangular plate shape with the planar opposing faces, and they are orthogonal to the moving direction of the cord C with the opposing faces in parallel with each other with a predetermined interval which is wider than the diameter of the cord C and through which the cord C can pass. Also, in the shaping bodies 21 and 22, a plurality of pairs of through holes 21H and 22H (cord passages) according to the number of the cords C with a predetermined diameter through which the cords C are passed, respectively, are formed linearly in the moving direction of each cord C and side by side in the X-direction.

In addition, in this shaping device 20, the movable shaping body 22 is configured movably in an arbitrary direction in a condition in parallel with the stationary shaping body 21, and the movable shaping body 22 can be moved within a predetermined range of a plane (a plane including the X- and Y-directions orthogonal to each other in the figure) (hereinafter referred to as an XY plane) orthogonal to the cord C so that the through holes 21H and 22H become eccentric with respect to each other. As a result, the shaping device 20 continuously displaces the through holes 22H of the movable shaping body 22 in an arbitrary direction around the through holes 21H of the stationary shaping body 21 at a fixed position, and changes a situation of the through holes 21H and 22H between a situation in which the both through holes 21H and 22H are matched and made concentric and a situation in which they are displaced by a predetermined distance and become eccentric (position displaced).

The cord manufacturing apparatus 1 supplies the cords C by the above-described supply device so as to sequentially pass them through the through holes 21H and 22H of the shaping bodies 21 and 22, while the cords C is bent which passes between the through holes 21H and 22H that have become eccentric due to the movement of the movable shaping body 22. As a result, the linear cords C are continuously bent and deformed by a direction, a degree of the bending or a deformation amount corresponding to the eccentric direction, the eccentric amount and the like of the through holes 21H and 22H and are shaped into a predetermined form such as a helical form or the like. At that time, the stationary shaping body 21 and the movable shaping body 22 have the plurality of through holes 21H and 22H, respectively, forming pairs through which the same cord C is passed, respectively, and a plurality of the cords C is passed and shaped similarly and at the same time. Thus, this shaping device 20 is provided with a moving device that moves the movable shaping body 22 in accordance with the form into which the cord C is shaped, and the movement of this movable shaping body 22 will be described below in detail.

Figure 2:
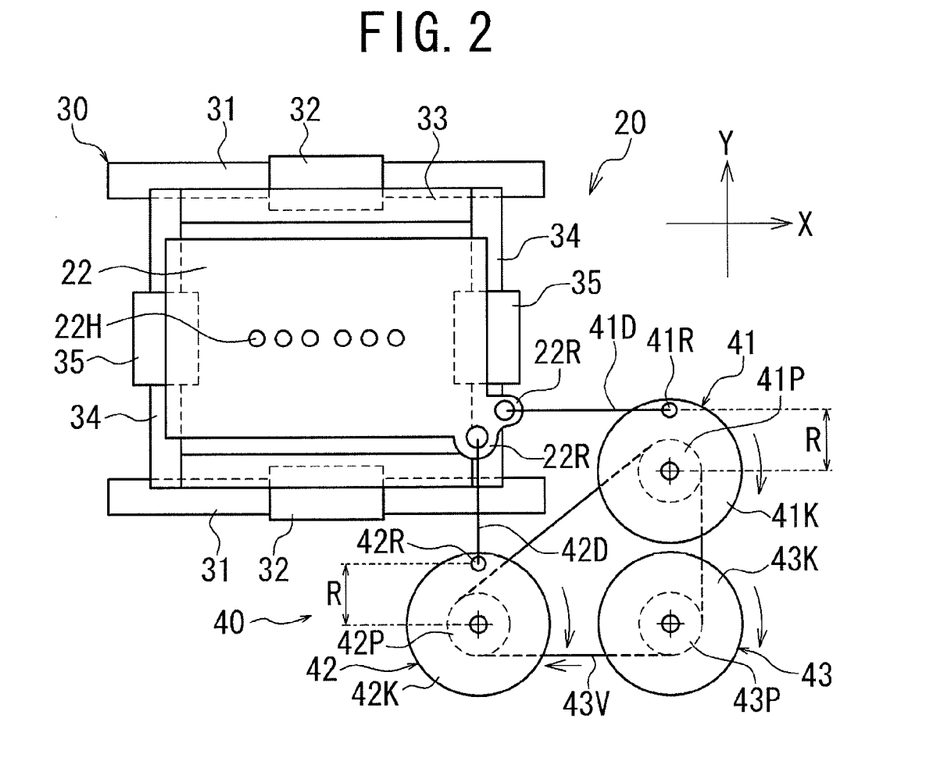
FIG. 2 is a schematic diagram of an essential part illustrating an extracted configuration relating to movement of a movable shaping body of this embodiment.

FIG. 2 is schematic diagram of an essential part which extracts and illustrates a configuration relating to the movement of the movable shaping body 22 and is a view of the shaping device 20 on arrow in the Z-direction of FIG. 1 seen from the downstream side of the cord C.

The shaping device 20 is provided with, as shown in the figure, a moving stage (movable mechanism) 30 that movably supports the movable shaping body 22 in the XY-plane and a moving device 40 that moves the movable shaping body 22 as described above.

The moving stage 30 has a pair of upper and lower guide rails 31 arranged in the horizontal direction (X-direction in the figure) and sliders 32 mounted on each of the guide rails 31 movably in the longitudinal direction (X-direction). The pair of guide rails 31 are arranged with a predetermined interval between them in the perpendicular direction (Y-direction in the figure). A frame-shaped member 33 formed a substantially rectangular shape having an opening is arranged between the guide rails 31 and is fixed to the both sliders 32. On this frame-shaped member 33, a pair of guide rails 34 extending in the Y-direction are provided on both right and left sides orthogonally to the guide rails 31 in the X-direction, and sliders 35 are mounted movably in the Y-direction on the respective guide rails 34.

The moving stage 30 displaces (moves) the movable shaping body 22 fixed to the both sliders 35 together with the sliders 35 in the Y-direction and also displaces the movable shaping body 22 together with the frame-shaped member 33 and the other sliders 32 in the X-direction along the guide rails 31. As described above, the moving stage 30 constitutes a movable stage (i.e. XY-stage) by each of the above connected portions and continuously moves the movable shaping body 22 to an arbitrary position in the XY-plane in accordance with the displacement in the XY-directions.

The moving device 40 has a first and a second displacement mechanism 41 and 42 that are connected to the movable shaping body 22 and reciprocatingly displace it in directions crossing each other and a driving mechanism 43 that drives the both displacement mechanisms 41 and 42, and here, it is configured such that each displacement amount of the both displacement mechanisms 41 and 42 can be changed independently. Also, the moving device 40 drives the both displacement mechanisms 41 and 42 by the driving mechanism 43 in synchronization and moves the movable shaping body 22 in response to the displacements by them in the both directions.

Specifically, each of the displacement mechanisms 41 and 42 of this embodiment has disk-shaped rotating bodies 41K and 42K rotatable around axes, respectively, and power transmission members 41D and 42D that connect the rotating bodies 41K and 42K to the movable shaping body 22, respectively. Each of the power transmission members 41D and 42D has a rod shape, and end portions on the both sides are rotatably connected to connecting members 41R and 42R provided at the rotating bodies 41K and 42K so as to rotate integrally and a connection portion 22R formed at a corner part of the movable shaping body 22, respectively. Also, the power transmission members 41D and 42D are connected to the same positions in the circumferential direction (upper end positions in the figure) with respect to the respective rotating bodies 41K and 42K and arranged along the X-direction in the first displacement mechanism 41 and along the Y-direction in the second displacement mechanism 42, respectively, so as to be orthogonal to each other.

The driving mechanism 43 has a disk-shaped rotating body 43K rotatable around the axis, a driving pulley 43P fixed concentrically to the axis, and a driving source (not shown) constituted by a motor that rotates them and the like. Also, the driving mechanism 43 has an endless transmission belt 43V extended between the driving pulley 43P and driven pulleys 41P and 42P fixed concentrically to the rotating bodies 41K and 42K, respectively, and having the same diameter. The driving mechanism 43 rotates the driving pulley 43P so as to drive and circulate the transmission belt 43V and rotates each of the driven pulleys 41P and 42P at an identical angular velocity. As described above, the driving mechanism 43 is a rotating and driving mechanism to which the rotating bodies 41K and 42K of the first and second displacement mechanisms 41 and 42 are both connected and which transmits rotating power to the both rotating bodies 41K and 42K at the same time and rotates them in synchronization. The driving mechanism 43 moves the movable shaping body 22 by driving the both displacement mechanisms 41 and 42.

Figure 3:
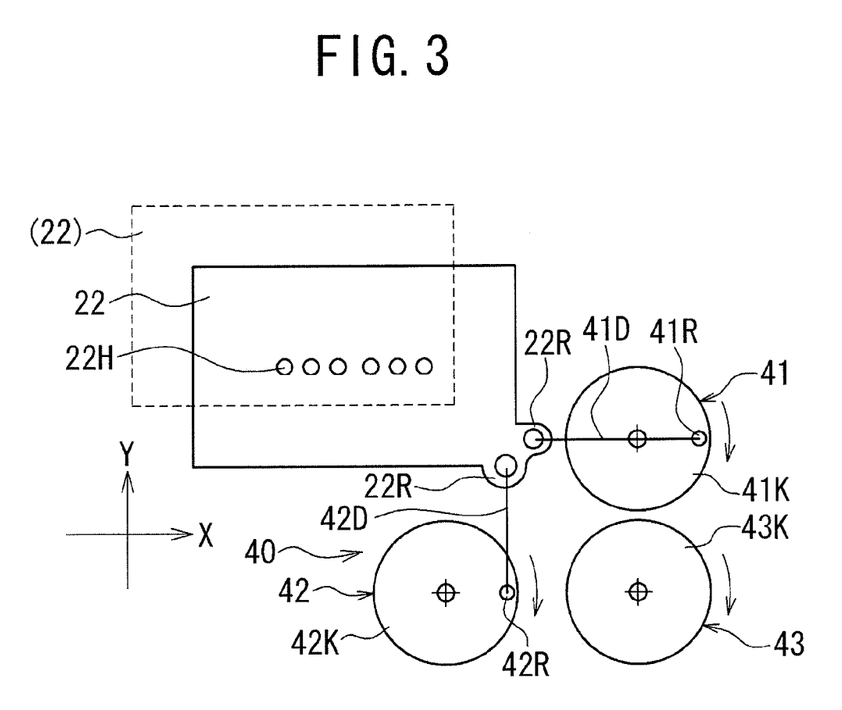
FIG. 3 is a schematic diagram of an essential part for explaining the movement of the movable shaping body.

FIG. 3 is a schematic diagram of an essential part for explaining the movement of the movable shaping body 22, in which the movable shaping body 22 before the movement is indicated by a dotted line and the movable shaping body 22 after the movement is indicated by a solid line.

The moving device 40 rotates the rotating bodies 41K and 42K in synchronization by the driving mechanism 43 at an identical angular velocity as shown in the figure and moves the respective connecting members 41R and 42R in the circumferential direction around the axes of the rotating bodies 41K and 42K, while maintaining the same circumferential positions (rotation angles). Also, the power transmission members 41D and 42D are displaced in accordance with rotation of the rotating bodies 41K and 42K via the connecting members 41R and 42R. The power in each displacement direction applies to the movable shaping body 22 and the movable shaping body 22 is moved so as to be displaced in synchronization with both directions.

At that time, the power transmission members 41D and 42D have the both end portions (connecting portions) rotationally moved in accordance with the displacement, respectively, and whereby they are displaced while maintaining the condition along the substantial X-direction and the substantial Y-direction, respectively. As a result, the power transmission members 41D and 42D convert the rotary motion of the connected rotating bodies 41K and 42K into a linear motion and transmit the linear motion to the movable shaping body 22 and apply power to the movable shaping body 22 in the directions crossing each other (the substantial X-direction and the substantial Y-direction, here) so as to reciprocatingly displace it. The moving device 40 displaces the movable shaping body 22 in synchronization with the displacement in each direction on the moving stage 30 (in the XY-plane) by the first and second displacement mechanisms 41 and 42 driven in synchronization as above and continuously moves the movable shaping body 22 to a position according to the respective displacement directions and displacement amounts. Therefore, the power transmission members 41D and 42D of the displacement mechanisms 41 and 42 constitute the power transmission mechanisms of the rotating bodies 41K and 42K together with the connecting members 41R, 42R and the like, respectively.

Here, in this embodiment, in order to change the displacement amount of the movable shaping body 22 by each of the displacement mechanisms 41 and 42, the connected positions of the power transmission members 41D and 42D constituting the power transmission mechanism on the side of the rotating bodies 41K and 42K become changeable, respectively, between the axis position and a predetermined rotation radial position. That is, mounting portions that mount and fix the connecting members 41R and 42R to the rotating bodies 41K and 42K are provided in plural from the axis position outward in the radial direction, and the above-described connected positions are changed as necessary by changing the mounting positions of the connecting members 41R and 42R, for example. Alternatively, engagement grooves of the connecting members 41R and 42R are formed in the rotating bodies 41K and 42K extending from the axis position outward in the radial direction, and the connecting members 41R and 42R are engaged with/fixed at the arbitrary position so as to change and set the connection positions. Alternatively, a plurality of the rotating bodies 41K and 42K having the connecting members 41R and 42R fixed at different rotation radial positions may be prepared so that the rotating bodies 41K and 42K are replaced and the connection positions are changed. Also, the power transmission members 41D and 42D are replaced by those having lengths that match the distance from the connecting members 41R and 42R of the respective rotating bodies 41K and 42K to the connection portion 22R of the movable shaping body 22, or each of the rotating bodies 41K and 42K is moved in accordance with the length of the power transmission members 41D and 42D.

In the displacement mechanisms 41 and 42, by changing the connection positions where the power transmission members 41D and 42D are connected with the rotating bodies 41K and 42K as described above, the displacement amounts of the connection positions and the power transmission members 41D and 42D are changed, respectively, when the rotating bodies 41K and 42K are rotated. As a result, the displacement amount in each direction (substantial X- and Y-directions) of the movable shaping body 22 is changed in accordance with rotation radius R (See FIG. 2) of the rotating bodies 41K and 42K at the positions where the power transmission members 41D and 42D are connected, and if the connection position is set on the axis (R=0), for example, the displacement amounts of the power transmission members 41D, 42D and the movable shaping body 22 become the minimum or zero. If the connection position is changed to a position with a large rotation radius R, the displacement amounts of the power transmission members 41D, 42D and the movable shaping body 22 also become large. The displacement mechanisms 41 and 42 can independently change and set the displacement amount in each direction of the movable shaping body 22 from zero to a predetermined amount by changing the connection position as above and reciprocatingly displace the movable shaping body 22 in each direction, respectively, by the displacement amounts according to the rotation radius R at the connection positions with the power transmission mechanism of the rotating bodies 41K and 42K.

Subsequently, procedures, operations and the like for manufacturing the cord C shaped in the longitudinal direction by continuously applying predetermined shaping to the cord C using this cord manufacturing apparatus 1 will be described. The procedures and operations described below are controlled by a controller (not shown) and performed by operating various portions of the apparatus in conjunction and in connection with each other at the timing and condition set in advance. This controller is constituted by a computer provided with a central processing unit (CPU), a ROM (Read Only Memory) that stores various programs, a RAM (Random Access Memory) that temporarily stores data to which the CPU makes a direct access and the like and to which various portions of the apparatus are connected through connecting means. As a result, the controller transmits/receives various types of data including a control signal to/from various portions of the apparatus and executes each operation relating to shaping of the cord C and the like, respectively.

The cord manufacturing apparatus 1 (See FIG. 1) first feeds out the cord C from each bobbin 11 of the cord feeding-out device 10, aligns the plurality of cords C by inserting them through the aligning device 15 and supplies them to the shaping device 20. Then, the cords C are sequentially passed through the through holes 21H and 22H of the stationary and movable shaping bodies 21 and 22 arranged opposite to each other. At that time, the movable shaping body 22 is moved by the moving device 40 (See FIG. 2) in the XY-plane along the stationary shaping body 21 as described above continuously and by repeating a predetermined moving mode. As a result, the through holes 21 and 22 forming a pair become eccentric, and the cords C passing through the opposing faces of the both shaping bodies 21 and 22 between the eccentric through holes 21H and 22H are bent and deformed so as to be shaped, respectively.

During this shaping, the cord manufacturing apparatus 1 reciprocatingly displaces the movable shaping body 22 in synchronization by the first and second displacement mechanisms 41 and 42 by each displacement amount set, respectively, in the directions crossing each other (here, the substantial X-direction and the substantial Y-direction) and shapes the passing cords C while continuously moving the movable shaping body 22 in response to the displacement in the both directions. However, these set displacement amounts can be changed independently of each other, they are set in advance in accordance with the mode of shaping to be applied to the cord C before the operation of the apparatus, and the same shaping is continuously and repeatedly applied to the cord C in the longitudinal direction by repeatedly moving the movable shaping body 22 in that condition.

Also, in this moving device 40, the pair of rotating bodies 41K and 42K provided in the displacement mechanisms 41 and 42 are rotated in the same direction around the axes in synchronization. By the power transmission mechanism constituted by the power transmission members 41D, 42D and the like, the rotary motion of each of the connected rotating bodies 41K and 42K is converted into a linear motion and the linear motion is continuously transmitted to the movable shaping body 22. As a result, the movable shaping body 22 is reciprocatingly displaced in each direction by the displacement amount according to the rotation radius R of the connection position with the power transmission mechanism of the rotating bodies 41K and 42K (the connecting members 41R and 42R, here) so as to move the movable shaping body 22 and perform shaping of the cord C. Also, by changing the connection positions of each of the power transmission members 41D and 42D (power transmission mechanism) with the rotating bodies 41K and 42K between the axis positions of the rotating bodies 41K and 42K and the predetermined rotation radius positions, each displacement amount in the substantial X- and Y-directions of the above-described movable shaping body 22 is set to the displacement amount according to the rotation radius R of the rotating bodies 41K and 42K at the connection positions.

FIGS. 4, 5, and 6 are schematic diagrams for explaining the movable shaping body 22 that moves by each displacement amount set as above and the cord C shaped by that, and here, an example is shown in which the displacement amount in the substantial X-direction by the first displacement mechanism 41 is set constant and the displacement amount in the substantial Y-direction (rotation radius R) by the second displacement mechanism 42 is changed.

Figure 4A:
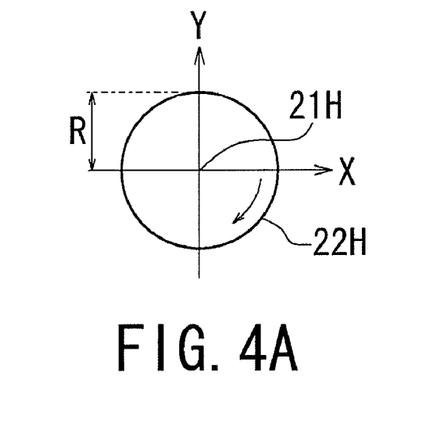
FIG. 4 is a schematic diagram for explaining the movable shaping body moving by each displacement amount that was set and a cord to be shaped.
Figure 4B:
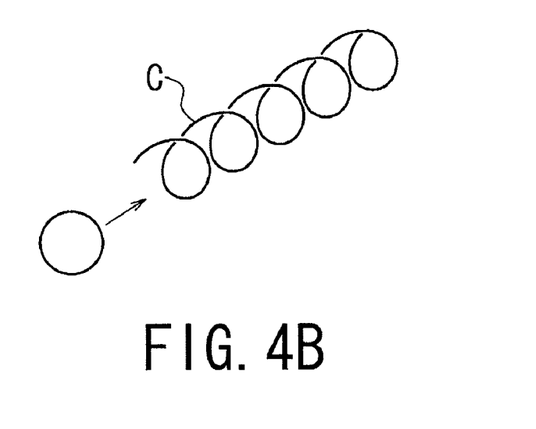

First, as shown in FIG. 4, if the rotation radiuses R of the rotating bodies 41K and 42K are set the same, the movable shaping body 22 (See FIG. 4A) is reciprocatingly displaced by the same displacement amount in the X-direction and the Y-direction in synchronization by means of the rotation thereof, and the movable shaping body 22 is moved at a predetermined speed while making a circular motion while the displacements are combined. By means of this movement, the through holes 22H of the movable shaping body 22 are moved along the circle having the radius R around the through holes 21H (origin position of FIG. 4A) of the stationary shaping body 21, respectively, and the through holes 21H and 22H are relatively displaced while becoming eccentric with respect to each other. In accordance with that, the cord C (See FIG. 4B) sequentially passing through the through holes 21H and 22H is also continuously bent and deformed as if drawing a circle while the direction and the degree of bending are changed, similar to the relative displacement of the through holes 21H and 22H. The cord id shaped helically forming a circular form when seen from the longitudinal direction so that the circular (coil-shaped) cord C extending helically is manufactured.

Figure 5A:
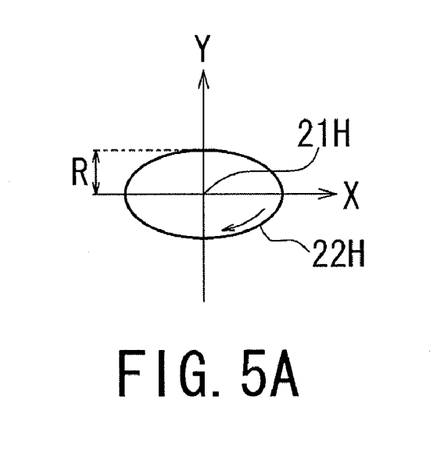
FIG. 5 is a schematic diagram for explaining the movable shaping body moving by each displacement amount that was set and the cord to be shaped.
Figure 5B:
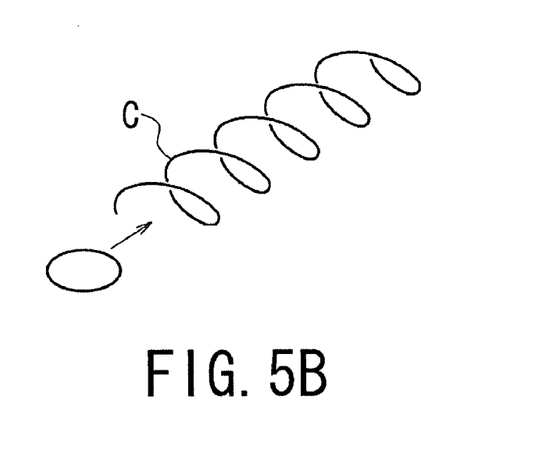

On the other hand, if the rotation radius R of the rotating body 42K is relatively set small and the displacement amount in the Y-direction is set smaller than that of the X-direction as shown in FIG. 5, the movable shaping body 22 (See FIG. 5A) is reciprocatingly displaced smaller in the Y-direction by means of the rotation of the rotating bodies 41K and 42K. As a result, the displacements in the both directions are combined, and the movable shaping body 22 is moved while making an elliptical motion. By means of this movement, the through holes 22H of the movable shaping body 22 are moved along the predetermined ellipse around the through holes 21H of the stationary shaping body 21, and the through holes 21H and 22H are brought off-center with respect to each other. In accordance with that, the cord C (See FIG. 5B) is also continuously bent and deformed so as to form the elliptic shape when seen from the longitudinal direction and shaped helically, and the cord C having the elliptic shape extending helically is manufactured.

Figure 6A:
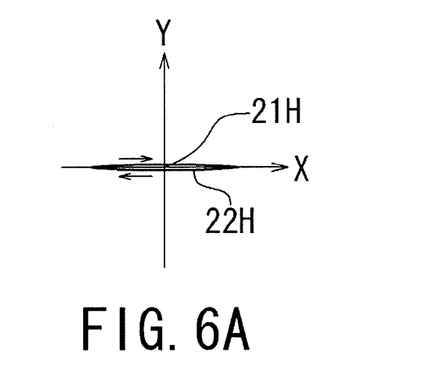
FIG. 6 is a schematic diagram for explaining the movable shaping body moving by each displacement amount that was set and the cord to be shaped.
Figure 6B:
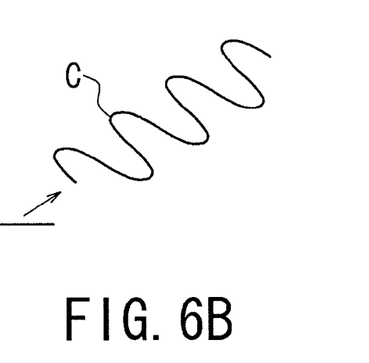

Also, as shown in FIG. 6, if the rotation radius R of the rotating body 42K and the displacement amount in the substantial Y-direction are set to zero, by means of the rotation of the rotating bodies 41K and 42K, the movable shaping body 22 (See FIG. 6A) is reciprocatingly displaced only in the substantial X-direction and moved linearly. By means of this movement, the through holes 22H of the movable shaping body 22 is repeatedly and reciprocatingly moved in the substantial X-direction around the through holes 21H of the stationary shaping body 21, and the through holes 21H and 22H become eccentric with respect to each other. In accordance with that, the cord C (See FIG. 6B) is also continuously bent and deformed in the same plane and shaped in the wavy form, and the wavy cord C extending in the wavy form in the longitudinal direction is manufactured.

After that, the cord manufacturing apparatus 1 (See FIG. 1) moves the plurality of shaped cords C to the rubber coating device 50 on the downstream side in the aligned state and coats the cords C with unvulcanized rubber. This rubber coating device 50 has an extruder 51 that heats/kneads and extrudes the unvulcanized rubber and a rubber coating head 52 connected to a rubber extrusion opening of the extruder 51. The plurality of cords C is passed through the cord passage formed in the rubber coating head 52 and are extruded together with the unvulcanized rubber. As a result, the inside of each of the plurality of shaped cords C is filled with rubber, and at the same time, rubber is made to adhere to the entire periphery thereof so as to coat them, and a reinforcing body H in which the aligned plurality of cords C is arranged is continuously formed in the sheet shape having the thickness obtained by adding the thickness of rubber coating the periphery to the shaping diameter (or the dimension in the thickness direction) of the cord C.

As described above, in this embodiment, since the displacement amounts in the both directions by the displacement mechanisms 41 and 42 that reciprocatingly displace the movable shaping body 22 can be changed independently of each other, the movable shaping body 22 can be moved in various modes by arbitrarily changing and combining the displacement amounts. As a result, the shaping form of the cord C to be shaped in the longitudinal direction or the length-to-width ratio, dimension and the like of the shaping form can be freely changed by the shaping device 20, and the helical cord C in the elliptical form having various forms and dimensions can be manufactured and in addition, the shaping form or characteristics of the cord C can be adjusted and changed so that the degree of freedom in selection or application thereof is improved. At that time, by changing the displacement amount or speed in the substantial X- or Y-direction, and by changing the rigidity or type of the cord C itself, the twisting structure, the number of twists, the moving speed and shaping wavelength of the cord C during shaping and the like, the characteristics of the shaped cord C can be changed in various ways. By arranging the shaped cord C having desired characteristics in a desired space in the thickness direction of the reinforcing body H, the characteristics of the reinforcing body H can be adjusted, the reinforcing body H with different characteristics even with the same thickness can be manufactured, and limitation on application of the reinforcing body H to a tire and the like can be also solved.

In addition, the stretching properties, arrangement dimensions and the like of the shaped cord C can be freely selected and the cord can be used without limitation. Since the desired characteristics of the reinforcing body H used in a tire can be obtained without increasing the thickness, for example, an arrangement space of the reinforcing body H can be reduced so as to improve the degree of freedom in application, and the application range of the reinforcing body H can be widened. Also, by applying helical shaping (See FIG. 5) having the elliptical form to the cord C, directivity of the cord's characteristics such as rigidity caused by the deformation direction as in the above-described wavy cord can be reduced and uniformity can be improved, and limitation on the portion where the cord C is to be used or attitude of the cord C can be lessened. At the same time, limitation of the cord C by the elongation rate as in the high elongation cord is small, large deformation applied to the cord C during manufacture or use of the tire can be handled, and durability and performances of the tire can be improved.

Here, if the displacement mechanisms 41 and 42 are constituted by the rotating bodies 41K and 42K and the power transmission mechanism that converts the rotary motion into the linear motion and transmits the linear motion to the movable shaping body 22, the movable shaping body 22 can be reliably displaced with a relatively simple configuration, and the reciprocating displacement of the movable shaping body 22 can be stably and repeatedly performed in the same condition. Also, the displacement amount in each direction of the movable shaping body 22 can be easily changed only by changing the connection positions of the power transmission mechanism with the rotating bodies 41K and 42K and by changing the rotation radius R, and the moving mode of the movable shaping body 22 can be easily changed. In addition, by using the driving mechanism 43 as the rotating and driving mechanism to which the both rotating bodies 41K and 42K are connected and in which they are rotated at the same time, the both rotating bodies 41K and 42K can be synchronized and rotated reliably and easily.

In this cord manufacturing apparatus 1, the plurality of cords C is shaped at the same time, but only one cord C may be shaped. However, as in the shaping bodies 21, 22 of this embodiment, by forming the plurality of through holes 21H and 22H forming pairs through which the same cords C are passed and by shaping the plurality of cords C at the same time, the cords C in the same shaped form can be manufactured in plural at one time. As a result, efficiency in the shaping of the cords C and the manufacture of the shaped cords C can be improved.

Also, the cord C to be shaped may be any cord made of other metal in addition to the steel cord, and it may be a single wire cord or twisted wire cord. In addition, the cord C coated with rubber in advance may be supplied and shaped such that a rubber-coated cord is supplied from the cord feeding-out device or an insulation device is provided between the cord feeding-out device 10 and the shaping device 20, and whereby each cord C is coated with rubber and supplied. On the other hand, the cord C not coated by rubber may be supplied and shaped, and in this case, the insulation device is provided between the shaping device 20 and the rubber coating device 50, and whereby the cord C after being shaped is coated by rubber, for example. As described above, the cord C according to the present invention refers to a linear member that can be shaped regardless of its material, structure and the like.

Moreover, in this embodiment, the displacement mechanisms 41 and 42 are constituted by the rotating bodies 41K and 42K and the power transmission members 41D and 42D and the like, but the rotating bodies 41K and 42K and the movable shaping body 22 may be connected to each other by a power transmission mechanism of another configuration so that the movable shaping body 22 is displaced. At that time, the rotating bodies 41K and 42K may be used as cams and cam followers following the cams may be provided on the movable shaping body 22 so as to constitute the power transmission mechanism and the displacement mechanisms 41 and 42, for example.

Figure 7:
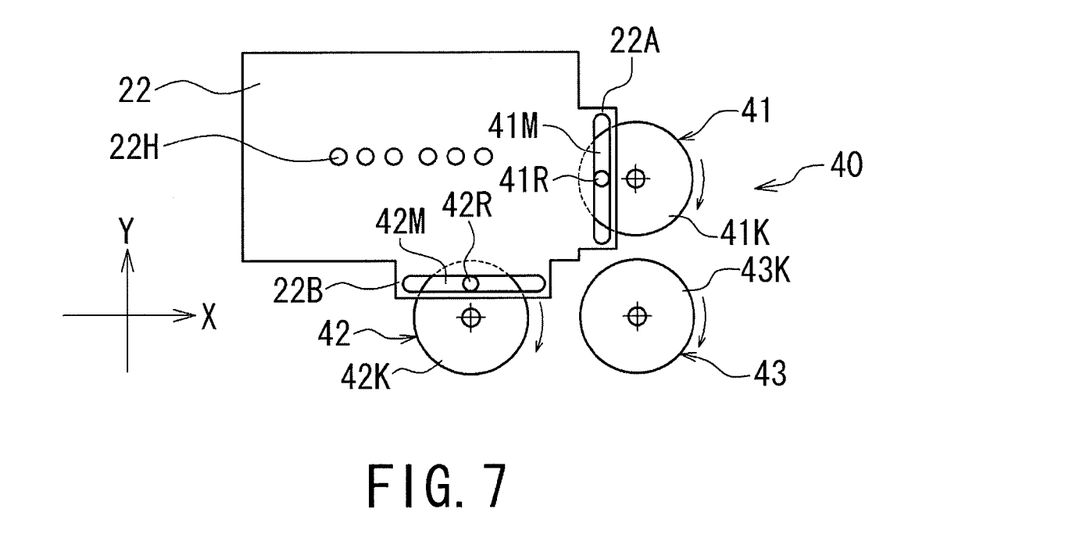
FIG. 7 is a schematic diagram of an essential part illustrating another example of a moving device.

FIG. 7 is a schematic diagram of an essential part illustrating another example of the moving device 40 including such displacement mechanisms 41 and 42, and the configuration relating to the movement of the movable shaping body 22 is extracted and shown corresponding to FIGS. 2 and 3.

This moving device 40 is provided with, as shown in the figure, the displacement mechanisms 41 and 42 having the rotating bodies 41K and 42K on which the connecting members 41R and 42R are provided and the driving mechanism 43 that drives the displacement mechanisms 41 and 42 similarly to the above. The rotating body 43K of the driving mechanism 43 is connected to the driven pulley of each of the rotating bodies 41K and 42K via the driving pulley and the transmission belt, though not shown. However, herein, projecting pieces 22A and 22B, each having a rectangular shape, projecting toward each of the displacement mechanisms 41 and 42 are provided in the movable shaping body 22, and power transmission grooves 41M and 42M are formed in the projecting pieces 22A and 22B so as to extend linearly in the X-direction and the Y-direction, respectively. Also, the connecting members 41R and 42R are inserted into the power transmission grooves 41M and 42M so as to slide in the longitudinal direction of the grooves 41M and 42M, respectively. The connecting members 41R and 42R are provided at predetermined rotation radial positions (or axis positions) of the rotating bodies 41K and 42K overlapping them, respectively.

In this moving device 40, when the rotating bodies 41K and 42K are rotated by the driving mechanism 43 at an identical angular velocity in synchronization, each of the connecting members 41R and 42R is moved in the circumferential direction and slides in each of the power transmission grooves 41M and 42M. At that time, a force in the X-direction is made to act on the movable shaping body 22 from the first displacement mechanism 41 via the connecting member 41R and the power transmission groove 41M (groove wall portion) in contact with each other so as to displace the movable shaping body 22 in the X-direction in accordance with the rotation of the rotating body 41K. Also, a force in the Y-direction is made to act on the movable shaping body 22 from the second displacement mechanism 42 via the connecting member 42R and the power transmission groove 42M in contact with each other so as to displace the movable shaping body 22 in the Y-direction in accordance with the rotation of the rotating body 42K. In the moving device 40, the power transmission mechanism that transmits the forces of the rotating bodies 41K and 42K to the movable shaping body 22 is constituted by the connecting members 41R and 42R and the power transmission grooves 41M and 42M as above, the movable shaping body 22 is reciprocatingly displaced in both directions in conjunction. As described above, the position of each of the connecting members 41R and 42R is adjusted, or the rotating bodies 41K and 42K is replaced and the like, the movable shaping body 22 is continuously moved to the position according to the respective displacement directions and displacement amounts (the rotation radiuses R of the connecting members 41R and 42R) so that the cord C is shaped.

Subsequently, an example in which the cord C shaped as above is applied to a tire and used as its belt will be described. Also, here, the tire manufactured by forming the reinforcing body H from the plurality of helical cords C (See FIG. 5), each having the elliptical form and arranging the reinforcing body H at a predetermined position in the tire will be described.

Figure 8:
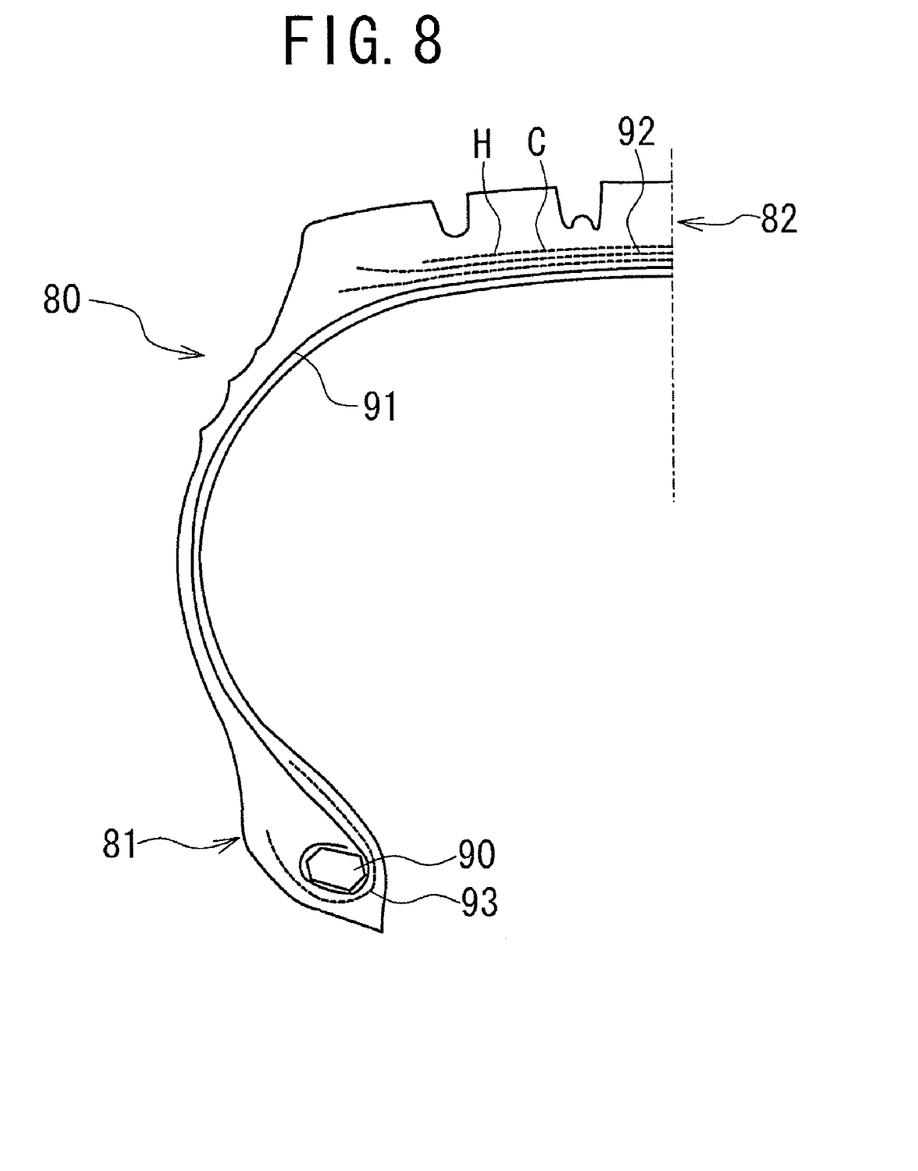
FIG. 8 is a sectional view of a tire having the cord of this embodiment.

FIG. 8 is a sectional view illustrating a tire having this cord C and schematically illustrates an essential part on one side of the section in the tire width direction (right-to-left direction in the figure).

In a tire 80, as shown in the figure, a pair of bead cores 90 arranged in a bead portion 81, a carcass ply 91 extending between the bead cores 90 in a toroidal state, and plural layers of belts 92 arranged in a tread portion 82 on the outer peripheral side of the carcass ply 91 are provided. Also, a bead reinforcing layer 93 is arranged in the bead portion 81 surrounding the bead cores 90 and the carcass ply 91 wound around the bead cores 90. In addition, in this tire 80, at least one layer of the belt 92 is formed by the reinforcing body H in which a plurality of the shaped cords C is arranged, and each cord C is arranged so as to extend in a predetermined direction by inclining it with respect to the tire circumferential direction and the like.

As described above, by using the helical cord C having an elliptical form in the belt 92, it is possible to obtain a large diameter-growth suppressing effect against a change over time of the tire outer periphery, and the tire dimension can be maintained constant. Also, an impact acted to the tire 80 from the outside can be effectively alleviated, and cords of the carcass ply 91 and the like can be protected. Moreover, by arranging this belt 92 over the belt 92 having a prior-art linear cord, a mesh-state structure can be realized by having the mutual cords C crossed by each other, and the characteristics of the entire belt 92 can be adjusted along with the change of the shaping form and the like of the cord C, and thus, the deformation amount of the tread portion 82 can be arbitrarily controlled. However, this description does not limit application targets of the helical cord C.

DESCRIPTION OF THE REFERENCE SYMBOLS

1: cord manufacturing apparatus, 10: cord feeding-out device, 11: bobbin, 15: aligning device, 20: shaping device, 21: stationary shaping body, 21H: through hole, 22: movable shaping body, 22H: through hole, 30: moving stage, 31: guide rail, 32: slider, 33: frame-shaped member, 34: guide rail, 35: slider, 40: moving device, 41: first displacement mechanism, 41D: power transmission member, 41K: rotating body, 41P: driven pulley, 41R: connecting member, 42: second displacement mechanism, 42D: power transmission member, 42K: rotating body, 42P: driven pulley, 42R: connecting member, 43: driving mechanism, 43K: rotating body, 43P: driving pulley, 43V: transmission belt, 50: rubber coating device, 51: extruder, 52: rubber coating head, C: cord, H: reinforcing body

The invention claimed is:

1. A cord manufacturing apparatus that manufactures a cord shaped in a longitudinal direction, the apparatus comprising:
 a stationary shaping body and a movable shaping body arranged opposite to each other and having through holes through which the cord is passed, respectively, the movable shaping body being capable of moving along the stationary shaping body so that the through holes become eccentric with respect to each other;
 a supply device that supplies and sequentially passes the cord through the through holes of respective shaping body; and
 a moving device that bends and shapes the cord passing between the through holes having become eccentric with respect to each other due to movement of the movable shaping body, wherein
 the moving device has a first and a second displacement mechanism which reciprocatingly displace the movable shaping body in directions crossing each other and whose displacement amounts can be independently changed and a driving mechanism that moves the movable shaping body in response to the displacement in the both directions by driving the first and second displacement mechanisms.

2. The cord manufacturing apparatus according to claim 1, wherein
 each of the displacement mechanisms has a rotating body rotatable around an axis and a power transmission mechanism that connects the rotating body and the movable shaping body, converts a rotary motion of the rotating body into a linear motion, and transmits the linear motion to and displaces the movable shaping body, the connection position on the rotating body side being changeable between the axis position and a predetermined rotation radius position, and the each displacement mechanism reciprocaingly displaces the movable shaping body by a displacement amount according to a rotation radius at the connection position with the power transmission mechanism of the rotating body.

3. The cord manufacturing apparatus according to claim 2, wherein
 the driving mechanism has a rotating and driving mechanism to which the rotating bodies of the first and second displacement mechanisms are connected and which transmits rotation power to the both rotating bodies at the same time to rotate them.

4. The cord manufacturing apparatus according to any of claims 1 to 3, wherein
 each of the stationary shaping body and the movable shaping body has a plurality of through holes forming pairs through which the same cord is passed and shapes the plurality of cords at the same time.

5. A cord manufacturing method that manufactures a cord shaped in a longitudinal direction, the method comprising the steps of:
 sequentially passing a cord through through holes of a stationary and movable shaping bodies arranged opposite to each other; and
 moving the movable shaping body along the stationary shaping body so that the through holes become eccentric with respect to each other, bending and shaping the cord passing between the eccentric through holes, wherein
 the shaping step includes the steps of reciprocatingly displacing the movable shaping body in directions crossing each other by respective set displacement amounts, and shaping the passing cord while moving the movable shaping body in response to the displacements in the both directions, and the respective set displacement amounts can be changed independently of each other.

6. The cord manufacturing method according to claim 5, wherein
 the step of reciprocating displacement includes the steps of rotating a pair of rotating bodies around axes, and converting a rotary motion of each rotating body into a linear motion by a power transmission mechanism connected, respectively, to transmit the linear motion to the movable shaping body and reciprocatingly displacing the movable shaping body in each direction by a displacement amount according to a rotation radius of a connection position with the power transmission mechanism of the rotating body; and
 the method comprising the step of changing the connection position of each power transmission mechanism with the rotating body between the axis position of the rotating body and a predetermined rotation radius position and setting each of the displacement amounts to a displacement amount according to the rotation radius of the rotating body at the connection position.

* * * * *